United States Patent
Sazuka et al.

(10) Patent No.: US 7,993,043 B2
(45) Date of Patent: Aug. 9, 2011

(54) VEHICLE LAMP

(75) Inventors: Kiyoshi Sazuka, Shizuoka (JP); Michio Tsukamoto, Shizuoka (JP); Shigeyuki Watanabe, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 268 days.

(21) Appl. No.: 12/362,684

(22) Filed: Jan. 30, 2009

(65) Prior Publication Data
US 2009/0196060 A1    Aug. 6, 2009

(30) Foreign Application Priority Data

Feb. 4, 2008   (JP) ................ 2008-023791

(51) Int. Cl.
*F21V 7/09*   (2006.01)
*B60Q 1/16*   (2006.01)
(52) U.S. Cl. ............ 362/509; 362/545; 362/518
(58) Field of Classification Search ........... 362/509, 362/543, 544, 545, 516, 514, 517, 518, 230, 362/231, 800
See application file for complete search history.

(56) References Cited

U.S. PATENT DOCUMENTS

| | | | | |
|---|---|---|---|---|
| 6,736,523 B2 * | 5/2004 | Alvey | ............ | 362/158 |
| 7,527,405 B2 * | 5/2009 | Tatsukawa | ............ | 362/538 |
| 7,654,714 B2 * | 2/2010 | Mochizuki et al. | ............ | 362/539 |
| 2003/0072167 A1 | 4/2003 | Albou | | |
| 2004/0240219 A1 | 12/2004 | Oishi et al. | | |
| 2006/0120094 A1 * | 6/2006 | Tsukamoto et al. | ............ | 362/518 |

FOREIGN PATENT DOCUMENTS

| | | |
|---|---|---|
| DE | 10 2004 012184 A1 | 12/2004 |
| DE | 10 2007 015233 A1 | 10/2008 |
| JP | 2003-019919 A | 1/2003 |
| JP | 2004-146162 A | 5/2004 |
| WO | 02/49915 A1 | 6/2002 |
| WO | 2008/074392 A2 | 6/2008 |

OTHER PUBLICATIONS

European Search Report for European Application No. 09001439.0-2423 dated Mar. 29, 2010, 6 pages.

* cited by examiner

*Primary Examiner* — Bao Q Truong
(74) *Attorney, Agent, or Firm* — Osha • Liang LLP (57) ABSTRACT

A vehicle lamp, which is configured to irradiate infrared light in a vehicle forward direction, includes: a projection lens disposed along an optical axis extending in a lamp backward and forward direction; and first and second light source units disposed in the rear of the projection lens. The first light source unit includes: a first light emitting element which is disposed in the rear of a rear focal point of the projection lens and emits the infrared light; and a first reflector which reflects the infrared light toward the optical axis in a lamp forward direction. An infrared light distribution pattern is formed by the infrared light which is reflected by the first reflector to pass through the projection lens. The second light source unit includes: a second light emitting element which is disposed in the rear of the rear focal point of the projection lens and emits visible light; and a second reflector which reflects the visible light toward the optical axis in a lamp forward direction. A visible light distribution pattern is formed by the visible light which is reflected by the second reflector to pass through the projection lens. The visible light distribution pattern overlaps with the infrared light distribution pattern. When the first light source unit is turned on, the second light source unit is turned on simultaneously with the first light source.

7 Claims, 9 Drawing Sheets

VEHICLE LAMP

CROSS-REFERENCE TO RELATED APPLICATIONS

This application claims priority from Japanese Patent Application No. 2008-023791, filed on Feb. 4, 2008, the entire contents of which are hereby incorporated by reference.

BACKGROUND OF INVENTION

1. Field of the Invention

The present disclosure relates to a vehicle lamp configured to irradiate infrared light in a vehicle forward direction.

2. Related Art

In recent years, an infrared-light night vision camera system is used in order to improve night driving safety. The infrared-light night vision camera system picks up an image in a vehicle forward direction while irradiating infrared light in a vehicle forward direction and recognizes a state in a vehicle forward direction by displaying the pick-up image on a monitor or the like.

In terms of the infrared-light night vision camera system, it is possible to obtain information in a vehicle forward direction, the information being not obtainable during a general visible light irradiation operation. For example, in a state where a head lamp unit irradiates the visible light in a low beam mode, it is not possible to obtain information on a space above a cutoff line of a low beam distribution pattern. However, when the infrared light is irradiated together with the visible light, it is possible to sufficiently recognize a situation in a vehicle forward direction without giving a glare to a driver or the like in the opposite vehicle.

In the infrared-light night vision camera system, the infrared light in a near-infrared range is used. However, since a red light is included in a part of the irradiated light, a front lens is tinged with red when a vehicle lamp is observed from the front side upon irradiating the infrared light, thereby causing a problem in that the driver in the opposite vehicle feels uncomfortable.

For this reason, in the past, as disclosed in JP-A-2003-19919 or JP-A-2004-146162, a study has been carried out which prevents in advance the front lens from being tinged with red in such a manner that the red light and the visible light are simultaneously irradiated from the vehicle lamp.

In the vehicle lamp disclosed in JP-A-2003-19919, the red light and the visible light are simultaneously irradiated in such a manner that an infrared light non-formation region, through which a visible light component of a light source passes, is formed in the outer periphery of an infrared light transmission film through which a red light component of the light source passes.

On the other hand, in the vehicle lamp disclosed in JP-A-2004-146162, the red light and the visible light are simultaneously irradiated in such a manner that an incandescent bulb is disposed in front of an infrared light transmission filter disposed in a lamp room and the incandescent bulb is simultaneously turned on upon irradiating the red light.

The vehicle lamp disclosed in JP-A-2003-19919 or JP-A-2004-146162 has a function of preventing the front lens from being tinged with red upon irradiating the infrared light in a vehicle forward direction, but does not have any other functions.

That is, the vehicle lamp disclosed JP-A-2003-19919 is not configured to irradiate the visible light.

On the other hand, the vehicle lamp disclosed in JP-A-2004-146162 is configured to irradiate the visible light by turning on the incandescent bulb in addition to the infrared light. However, since the light of the incandescent bulb is not controlled upon being emitted from the front lens, it is difficult to form a desired light distribution pattern by means of the light of the incandescent bulb.

SUMMARY OF INVENTION

Exemplary embodiments of the present invention may overcome any of the problems described above or provide other advantages.

In one aspect, embodiments of the invention provide a vehicle lamp configured to irradiate the infrared light in a vehicle forward direction, the vehicle lamp being capable of easily forming the desired visible light distribution pattern in such a manner that the front lens is prevented from being tinged with red upon irradiating the infrared light, and the visible light is separately irradiated in addition to the infrared light.

According to one or more embodiments of the present invention, there is provided a vehicle lamp configured to irradiate infrared light in a vehicle forward direction. The vehicle lamp includes: a projection lens disposed along an optical axis extending in a lamp backward and forward direction; and first and second light source units disposed in the rear of the projection lens. The first light source unit includes: a first light emitting element which is disposed in the rear of a rear focal point of the projection lens and emits the infrared light; and a first reflector which reflects the infrared light toward the optical axis in a lamp forward direction. An infrared light distribution pattern is formed by the infrared light which is reflected by the first reflector to pass through the projection lens. The second light source unit includes: a second light emitting element which is disposed in the rear of the rear focal point of the projection lens and emits visible light; and a second reflector which reflects the visible light toward the optical axis in a lamp forward direction. A visible light distribution pattern is formed by the visible light which is reflected by the second reflector to pass through the projection lens. The visible light distribution pattern overlaps with the infrared light distribution pattern. When the first light source unit is turned on, the second light source unit is turned on simultaneously with the first light source.

According to one or more embodiments of the present invention, when the first light source unit and the second light source unit are simultaneously turned on, the second light source unit is turned on so as to be dimmer than a normal lamp-on state.

According to one or more embodiments of the present invention, the visible light distribution pattern is extended up to a position above the infrared light distribution pattern.

According to one or more embodiments of the present invention, the first reflector is disposed above the optical axis and the second reflector is disposed below the optical axis.

According to one or more embodiments of the present invention, the vehicle lamp further includes: a mirror member disposed between the first reflector and the second reflector. The mirror member is formed with: an upward reflection surface substantially extending backward along the optical axis from the vicinity of a position in the rear of the rear focal point of the projection lens; and a downward reflection surface obliquely extending downward from a front edge of the upward reflection surface toward a lamp backward direction. The upward reflection surface reflects upward at least a part of the infrared light reflected by the first reflector such that said part of the infrared light is incident to the projection lens, and the downward reflection surface reflects downward at least a part of the visible light reflected by the second reflector such that said part of the visible light is incident to the projection lens.

Other aspects and advantages of the invention will be apparent from the following description, the drawings, and the claims.

BRIEF DESCRIPTION OF DRAWINGS

The above and other aspects, features, and advantages of the present invention will be more apparent from the following more particular description thereof, presented in conjunction with the following drawings wherein:

FIGS. 4A and 4B are perspective views showing a light distribution pattern formed by light irradiated forward from the vehicle lamp and formed on an imaginary perpendicular screen disposed at a forward position distanced from the vehicle lamp by 25 m, where

DETAILED DESCRIPTION

Hereinafter, exemplary embodiments of the present invention will be described with reference to the accompanying drawings.

Figure 1:
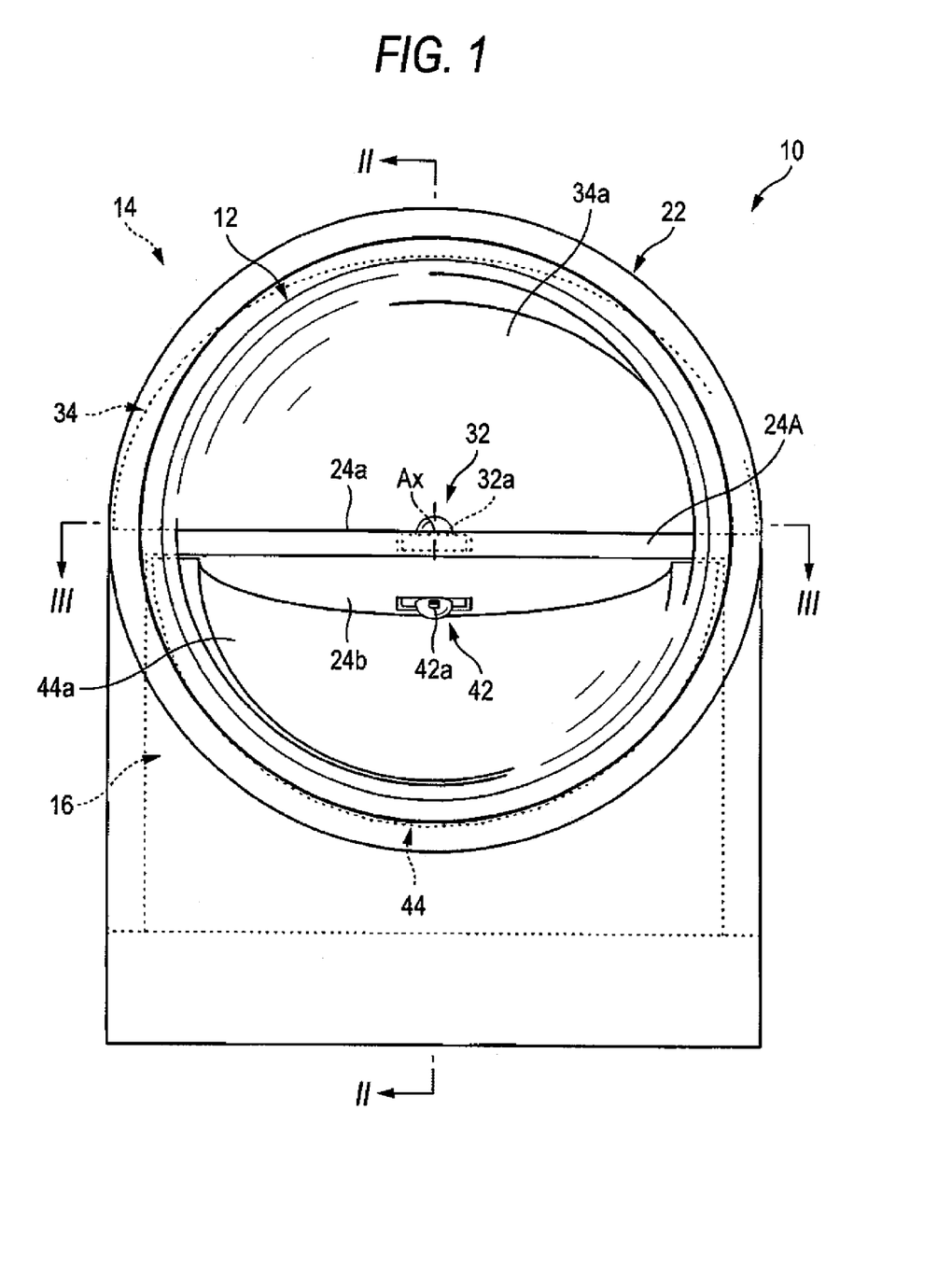
FIG. 1 is a front view showing a vehicle lamp according to an embodiment of the invention.
Figure 2:
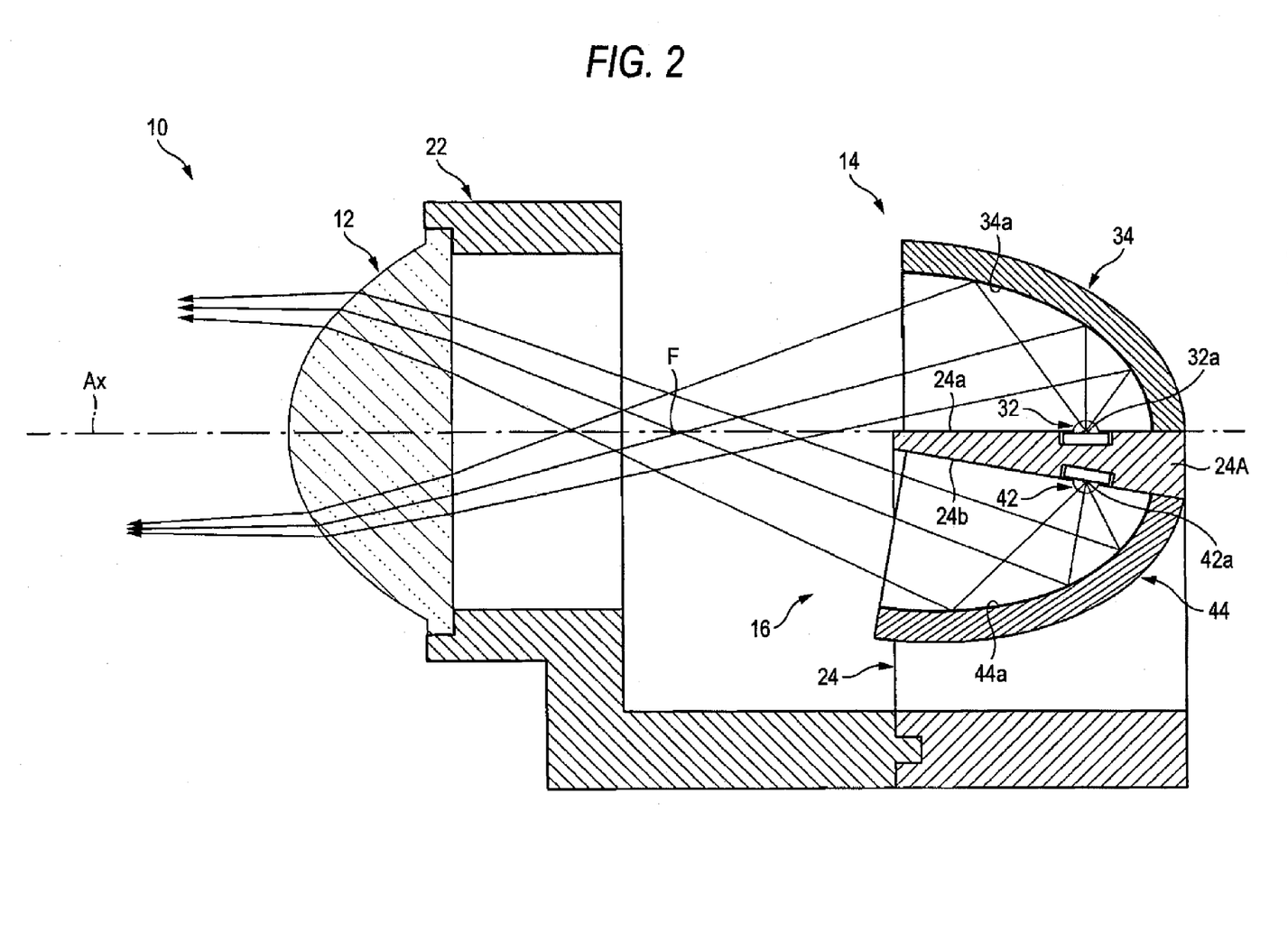
FIG. 2 is a cross-sectional view taken along the line II-II shown in FIG. 1.
Figure 3:
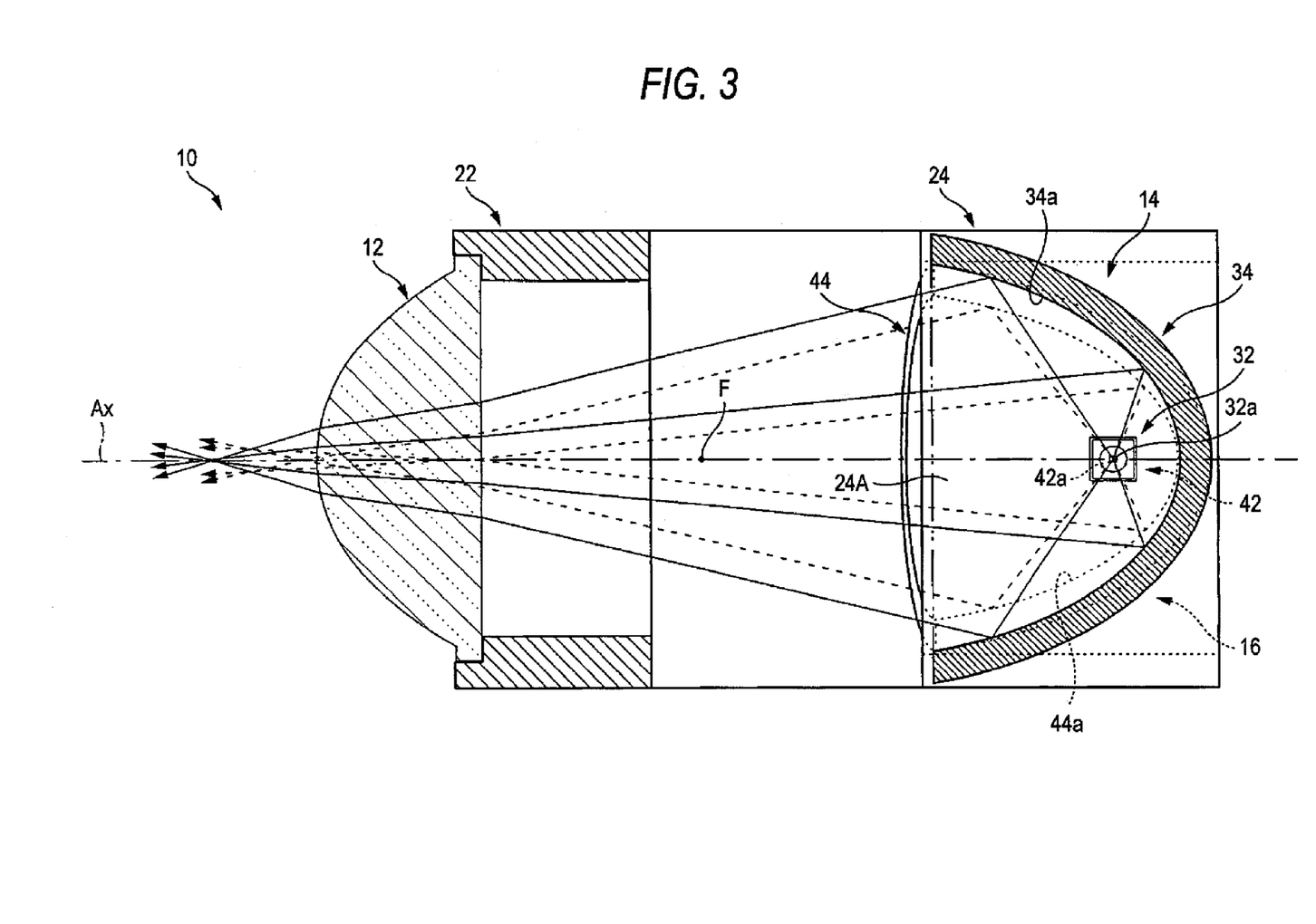
FIG. 3 is a cross-sectional view taken along the line III-III shown in FIG. 1.

FIG. 1 is a front view showing a vehicle lamp 10 according to an embodiment of the invention. FIG. 2 is a cross-sectional view taken along the line II-II shown in FIG. 1. FIG. 3 is a cross-sectional view taken along the line III-III shown in FIG. 1.

As shown in the drawings, the vehicle lamp 10 according to this embodiment includes a projection lens 12 disposed along an optical axis Ax extending in a lamp backward and forward direction, a first light source unit 14 for irradiating infrared light, and a second light source unit 16 for irradiating visible light, the first and second light source units being disposed in rear of the projection lens 12. The vehicle lamp 10 is configured to irradiate the infrared light and the visible light in a vehicle forward direction.

The vehicle lamp 10 and a head lamp unit (not shown) are used while being mounted to a lamp body (not shown) so that an optical axis thereof is adjustable. In a state where the optical axis adjustment is completed, an optical axis Ax is arranged so as to be inclined downward by about 0.5 to 0.6 degrees with respect to a vehicle longitudinal direction.

The projection lens 12 is configured as a flat-convex non-spherical lens in which a front-side surface is a convex surface and a rear-side surface is a plane, thereby changing a light source image formed on a rear focal plane (i.e., a focal plane including a rear focal point F) to an inverse image to be projected on an imaginary perpendicular screen disposed in front of the lamp. The projection lens 12 is supported to a lens holder 22.

The first and second light source units 14 and 16 are supported to an upper wall portion 24A of a light source unit holder 24. The upper wall portion 24A has a configuration in which an upper surface 24a is formed into a horizontal surface including the optical axis Ax and a lower surface 24b is formed into an inclined surface inclined downward in a lamp backward direction so that the first light source unit 14 is supported to the upper surface 24a and the second light source unit 16 is supported to the lower surface 24b. The light source unit holder 24 is formed so as to surround the second light source unit 16 in vertical and horizontal directions, and a lower wall portion thereof is fixed to a lower end portion of the lens holder 22.

The first light source unit 14 includes: a first light emitting element 32 disposed on the optical axis Ax in rear of the rear focal point F of the projection lens 12 so as to emit infrared light; and a first reflector 34 disposed to cover the first light emitting element 32 from the upside so as to reflect the infrared light, emitted from the first light emitting element 32, toward the optical axis Ax in a lamp forward direction.

The first light emitting element 32 is an infrared light emitting diode for emitting infrared light in a near-infrared range, and a light emitting chip 32a has a square-shaped light emitting surface of 1 millimeter ("mm") by 1 mm. The first light emitting element 32 is positioned and fixed to a light source support concave portion formed in the upper surface 24a of the upper wall portion 24A of the light source unit holder 24 in a state where the light emitting chip 32a is disposed on the optical axis Ax in a perpendicular upward direction.

A reflection surface 34a of the first reflector 34 is formed into a curved surface of a substantially oval shape in which a light emitting center of the first light emitting element 32 is set to a first focal point, thereby reflecting the infrared light, emitted from the first light emitting element 32, toward the optical axis Ax in a lamp forward direction. The reflection surface 34a has a perpendicular sectional shape taken along the optical axis Ax and formed in an oval shape in which a point positioned below the optical axis Ax and positioned in front of the rear focal point F is set to a second focal point. Additionally, an eccentricity is set to gradually increase from the perpendicular section toward the horizontal section. Accordingly, when the infrared light reflected by the reflection surface 34a passes through the rear focal plane of the projection lens 12, an infrared light passage region of the rear focal plane is set to a region of a horizontally-long oval shape in which the rear focal point F is set to a substantial center.

A peripheral lower end portion of the reflection surface 34a of the first reflector 34 is fixed to the upper surface 24a of the upper wall portion 24A of the light source unit holder 24.

On the other hand, the second light source 16 includes: a second light emitting element 42 disposed below the optical axis Ax in rear of the rear focal point F of the projection lens 12 so as to emit visible light; and a second reflector 44 disposed to cover the second light emitting element 42 from the downside so as to reflect the visible light, emitted from the second light emitting element 42, toward the optical axis Ax in a lamp forward direction.

The second light emitting element 42 is a white light emitting diode for emitting visible light, and a light emitting chip 42a has a square-shaped light emitting surface of 1 mm by 1 mm. The second light emitting element 42 is positioned and fixed to a light source support concave portion formed in the lower surface 24b of the upper wall portion 24A of the light source unit holder 24 in a state where the light emitting chip 42a is disposed in the vicinity of a position below the optical axis Ax so as to be slightly inclined forward in a perpendicular downward direction. The second light emitting element 42 is disposed to be positioned almost right below the first light emitting element 32 of the first light source unit 14.

A reflection surface 44a of the second reflector 44 is formed into a curved surface of a substantially oval shape in which a light emitting center of the second light emitting element 42 is set to a first focal point, thereby reflecting the visible light, emitted from the second light emitting element 42, toward the optical axis Ax in a lamp forward direction. The reflection surface 44a has a perpendicular sectional shape taken along the optical axis Ax and formed in an oval shape in which a point positioned above the optical axis Ax and positioned in front of the rear focal point F is set to a second focal point. Additionally, an eccentricity is set to gradually increase from the perpendicular section toward the horizontal section.

Accordingly, when the visible light reflected by the reflection surface 44a passes through the rear focal plane of the projection lens 12, a visible light passage region of the rear focal plane is set to a horizontally-long oval shape in which the rear focal point F is set to a substantial center. The visible light passage region is positioned so as to slightly displace downward from the infrared light passage region. Additionally, the visible light passage region is set so that a horizontal width is slightly smaller than that of the infrared light passage region and a vertical width is slightly larger than the infrared light passage region.

A peripheral upper end portion of the reflection surface 44a of the second reflector 44 is fixed to the lower surface 24b of the upper wall portion 24A of the light source unit holder 24.

The vehicle lamp 10 according to this embodiment is used together with the head lamp unit.

That is, when the head lamp unit is in a low beam mode, the vehicle lamp 10 turns on the first light source unit 14 and turns on the second light source unit 16 to be dimmer than a normal lamp-on state. On the other hand, when the head lamp unit is in a high beam mode, the vehicle lamp turns off the first light source 14 and turns on only the second light source unit 16 like the normal lamp-on state.

Figure 4A:
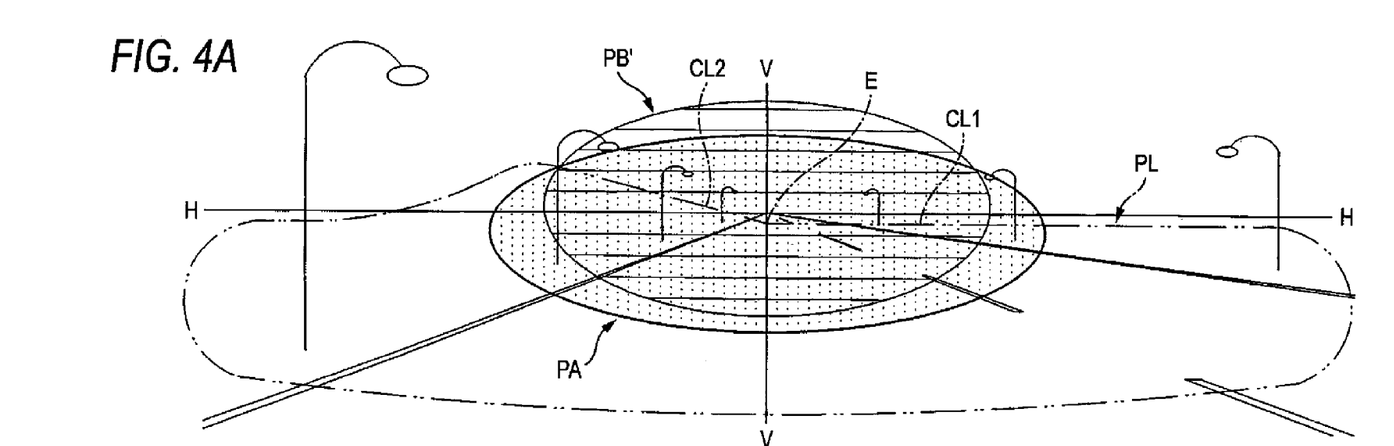
FIG. 4A is a view showing a light distribution pattern in a low beam mode and FIG. 4B is a view showing a light distribution pattern in a high beam mode.
Figure 4B:
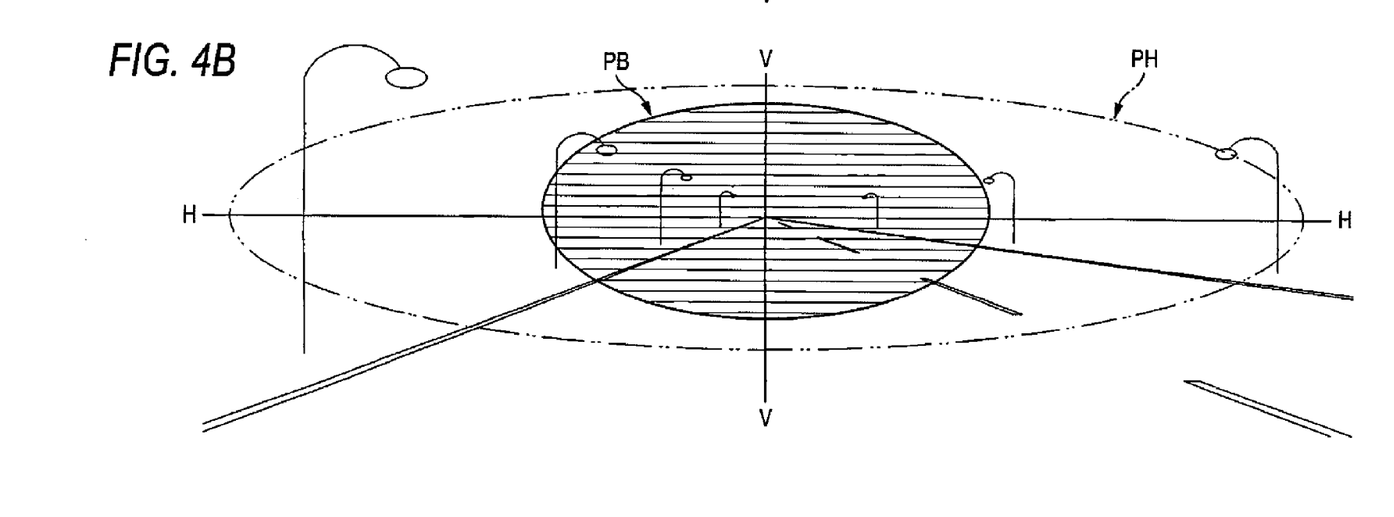

FIGS. 4A and 4B are perspective views showing a light distribution pattern formed by light irradiated forward from the vehicle lamp 10 according to this embodiment and formed on an imaginary perpendicular screen disposed at a forward position distanced from the vehicle lamp by 25 meters ("m").

As shown in FIG. 4A, when the bead lamp unit is in the low beam mode, an infrared light distribution pattern PA and a visible light distribution pattern PB' are formed while overlapping with a low beam distribution pattern PL formed by the light irradiated from the head lamp unit.

On the other hand, as shown in FIG. 4B, when the head lamp unit is in the high beam mode, a visible light distribution pattern PB is formed as a part of a high beam distribution pattern PH formed by the light irradiated from the head lamp unit.

In FIG. 4A, the low beam distribution pattern PL depicted by the two-dot chain line is a low beam distribution pattern of a left light distribution, and has a horizontal line CL1 and an inclined cutoff line CL2 at the upper end portion thereof. In a perpendicular line V-V passing through a horizontal line H-H at point H-V (i.e., a vanishing point in a lamp forward direction), the horizontal cutoff line CL1 is formed on the side of the opposite traffic lane and the inclined cutoff line CL2 is formed on the side of the self traffic lane, an elbow point E as an intersection point of both the cutoff lines CL1 and CL2 is positioned below the point H-V by about 0.5 to 0.6 degrees.

The infrared light distribution pattern PA is formed into a horizontally-long light distribution pattern in which an enlargement in a vertical direction is small and an enlargement in a horizontal direction is large with respect to a point in the vicinity of the elbow point E.

The reason why the infrared light distribution pattern PA is formed into the horizontally-long light distribution pattern is because the infrared light emitted from the first light emitting element 32 is reflected by the reflection surface 34a of the first reflector 34 of the first light source 14 so as to pass through the rear focal plane of the projection lens 12 in the infrared light passage region of the horizontally-long oval shape in which the rear focal point F of the projection lens 12 is set to the substantial center. Additionally, the reason why the infrared light distribution pattern PA is formed with respect to a point in the vicinity of the elbow point E is because the optical axis Ax extends downward by about 0.5 to 0.6 degrees in a vehicle longitudinal direction.

On the other hand, the visible light distribution pattern PB' is formed into a horizontally-long light distribution pattern in which an enlargement in a horizontal direction is larger than an enlargement in a vertical direction with respect to a point in the vicinity of the H-V. The visible light distribution pattern PB is formed into a light distribution pattern enlarged up to a position above the infrared light distribution pattern PA.

The reason why the visible light distribution pattern PB' is formed into the horizontally-long light distribution pattern is because the visible light emitted from the second light emitting element 42 is reflected by the reflection surface 44a of the second reflector 44 of the second light source unit 16 so as to pass through the rear focal plane of the projection lens 12 in the visible light passage region of the horizontally-long oval shape in which the rear focal point F of the projection lens 12 is set to the substantial center.

Additionally, the reason why the visible light distribution pattern PB' is formed with respect to the point in the vicinity of the H-V is because the passage region (i.e., the visible light passage region) in the rear focal plane of the visible light emitted from the second light emitting element 42 and reflected by the reflection surface 44a of the second reflector 44 is positioned so as to slightly displace downward from the passage region (i.e., the infrared light passage region) of the infrared light reflected by the reflection surface 34a of the first reflector 34.

Further, the reason why a horizontal divergence angle of the visible light distribution pattern PB' is slightly smaller than that of the infrared light distribution pattern PA is because a horizontal width of the visible light passage region is slightly smaller than that of the infrared light passage region. Additionally, the reason why a vertical divergence angle of the visible light distribution pattern PB' is slightly larger than that of the infrared light distribution pattern PA is because a vertical width of the visible light passage region is slightly larger than that of the infrared light passage region. As a result, the visible light distribution pattern PB' is formed into a light distribution pattern enlarged up to a position above the infrared light distribution pattern PA.

Likewise, when the head lamp unit is in the low beam mode, red light is irradiated from the vehicle lamp 10, but, at this time, the visible light is simultaneously irradiated from the vehicle lamp 10. Accordingly, it is possible to prevent in advance the projection lens 12 from being tinged with red when the vehicle lamp 10 is observed from the front side.

Although the visible light distribution pattern PB' is formed so as to vertically overlap with the horizontal and inclined cutoff lines CL1 and CL2, when the head lamp unit is in the low beam mode, the second light source unit 16 is turned on so as to be dimmer than a normal lamp-on state, thereby preventing in advance a glare from being given to a driver or the like in the opposite vehicle.

On the other hand, in FIG. 4B, the high beam distribution pattern PH depicted by the two-dot chain line is formed in a horizontally-long light distribution pattern enlarged in a horizontal direction with respect to the point H-V.

The visible light distribution pattern PB is a light distribution pattern formed by the visible light irradiated from the vehicle lamp 10 when the second light source unit 16 is turned on. Accordingly, the visible light distribution pattern PB is formed into a horizontally-long light distribution pattern in which an enlargement in a horizontal direction is larger than an enlargement in a vertical direction with respect to the point in the vicinity of the H-V in the same manner as the visible light distribution pattern PB', but is formed into a light distribution pattern much brighter than the visible light distribution pattern PB'.

Accordingly, the visible light distribution pattern PB forms a hot zone (i.e., a high-brightness region) of the high beam distribution pattern PH. Since the visible light distribution pattern PB is formed into the horizontally-long light distribution pattern formed with respect to the point in the vicinity of the point H-V, it is possible to brightly irradiate a road surface in a long-distance region in a vehicle forward direction without excessively brightly irradiating the road surface in a short-distance region.

As described above in detail, the vehicle lamp 10 according to this embodiment is configured to irradiate the infrared light in a vehicle forward direction, but includes the projection lens 12 disposed on the optical axis Ax extending in a lamp backward and forward direction, the first light source unit 14 for irradiating the infrared light, and the second light source unit 16 for irradiating the visible light, the first and second light source units being disposed in rear of the projection lens. Since the second light source unit 16 is configured to be simultaneously turned on when the first light source unit 14 is turned on, the visible light is simultaneously irradiated upon irradiating the red light, thereby preventing in advance the projection lens 12 from being tinged with red when the vehicle lamp 10 is observed from the front side.

The first light source unit 14 is configured to form the infrared light distribution pattern PA in such a manner that the infrared light emitted from the first light emitting element 32 disposed in rear of the rear focal point F of the projection lens 12 is reflected by the first reflector 34 toward the optical axis Ax in a lamp forward direction, and passes through the projection lens 12 so as to irradiate the infrared light in a lamp forward direction. Additionally, the second light source unit 16 is configured to form the visible light distribution pattern PB' at a position overlapping with the infrared light distribution pattern PA in such a manner that the visible light emitted from the second light emitting element 42 disposed in rear of the rear focal plane F of the projection lens 12 is reflected by the second reflector 44 toward the optical axis Ax in a lamp forward direction, and passes through the projection lens 12 so as to irradiate the visible light in a lamp forward direction. Accordingly, it is possible to obtain one or more of the following effects and advantages.

Since the position of the first light source unit 14 or the shape of the reflection surface of the first reflector 34 is appropriately set, it is possible to easily form the infrared light distribution pattern PA so as to have a desired shape or size. Accordingly, it is possible to arbitrarily set an infrared light irradiation range. On the other hand, since the position of the second light source unit 16 or the shape of the reflection surface of the second reflector 44 is appropriately set, it is possible to easily form the visible light distribution pattern PB' so as to overlap with the infrared light distribution pattern PA and to have a desired shape or size. Accordingly, it is possible to arbitrarily set a visible light irradiation range.

Since the infrared light distribution pattern PA is formed into the horizontally-long light distribution pattern in which an enlargement in a horizontal direction is larger than that in a vertical direction with respect to the point in the vicinity of the elbow point E, it is possible to pick up an image in a broad range in a vehicle forward direction by means of a night-vision camera. Accordingly, it is possible to sufficiently recognize a situation in a vehicle forward direction.

Further, in the vehicle lamp 10, when the second light source unit 16 and the first light source unit 14 are simultaneously turned on, the second light source unit is turned on so as to be dimmer than the normal lamp-on state. Accordingly, it is possible to obtain one or more of the following effects and advantages.

Although the visible light distribution pattern PB formed by the second light source unit 16 during the normal lamp-on state is used to form the hot zone of the high beam distribution pattern PH, when the infrared light and the visible light are simultaneously irradiated during the normal lamp-on state of the second light source unit 16, the brightness of the visible light exceeds a brightness level required to prevent the projection lens 12 from being tinged with red, thereby giving a glare to the driver or the like in the opposite vehicle.

Therefore, when the second light source unit 16 is simultaneously turned on so as to be dimmer than the normal lamp-on state, and the visible light distribution pattern PB' is formed by largely reducing the brightness of the visible light distribution pattern PB, it is possible to prevent the projection lens 12 from being tinged with red without giving a glare to the driver or the like in the opposite vehicle.

Additionally, since the visible light distribution pattern PB' formed by the second light source unit 16 is formed into the light distribution pattern enlarged up to a position above the infrared light distribution pattern PA, it is possible to prevent the projection lens 12 from being tinged with red even when the vehicle lamp 10 is observed in all directions in an angular range capable of generally seeing a pedestrian or the driver in the opposite vehicle.

Since the first reflector 34 is disposed above the optical axis Ax and the second reflector 44 is disposed below the optical axis Ax, it is possible to allow the reflected light of the first and second reflectors 34 and 44 to be incident to the projection lens 12 comparatively close to the optical axis Ax at the time when the visible light distribution pattern PB' formed by the second light source unit 16 is formed into the light distribution pattern enlarged up to a position above the infrared light distribution pattern PA. Accordingly, it is possible to form the visible light distribution pattern PB' and the infrared light distribution pattern PA with high precision.

Additionally, since the visible light distribution pattern PB' is formed into the horizontally-long light distribution pattern in which the enlargement in a horizontal direction is larger than the enlargement in a vertical direction with respect to the point in the vicinity of the H-V, and has the horizontal divergence angle slightly smaller than that of the infrared light distribution pattern PA and the vertical divergence angle slightly larger than that of the infrared light distribution pattern PA, it is possible to prevent the projection lens 12 from being tinged with red when the head lamp unit is in the low beam mode and to form the hot zone of the high beam distribution pattern PH formed into the horizontally-long visible light distribution pattern PB with respect to the point in the vicinity of the point H-V. Accordingly, it is possible to irradiate the road surface in the long-distance region without excessively brightly irradiating the road surface in the short-distance region.

Further, in the above-described embodiment, the light emitting chips 32a and 42a of the first and second light emitting elements 32 and 42 have square-shaped light emitting surfaces of 1 mm by 1 mm, respectively, but may, of course, have light emitting surfaces having different shapes or sizes.

Next, modified examples of the above-described embodiment will be described.

First, a first modified example of the above-described embodiment will be described.

Figure 5:
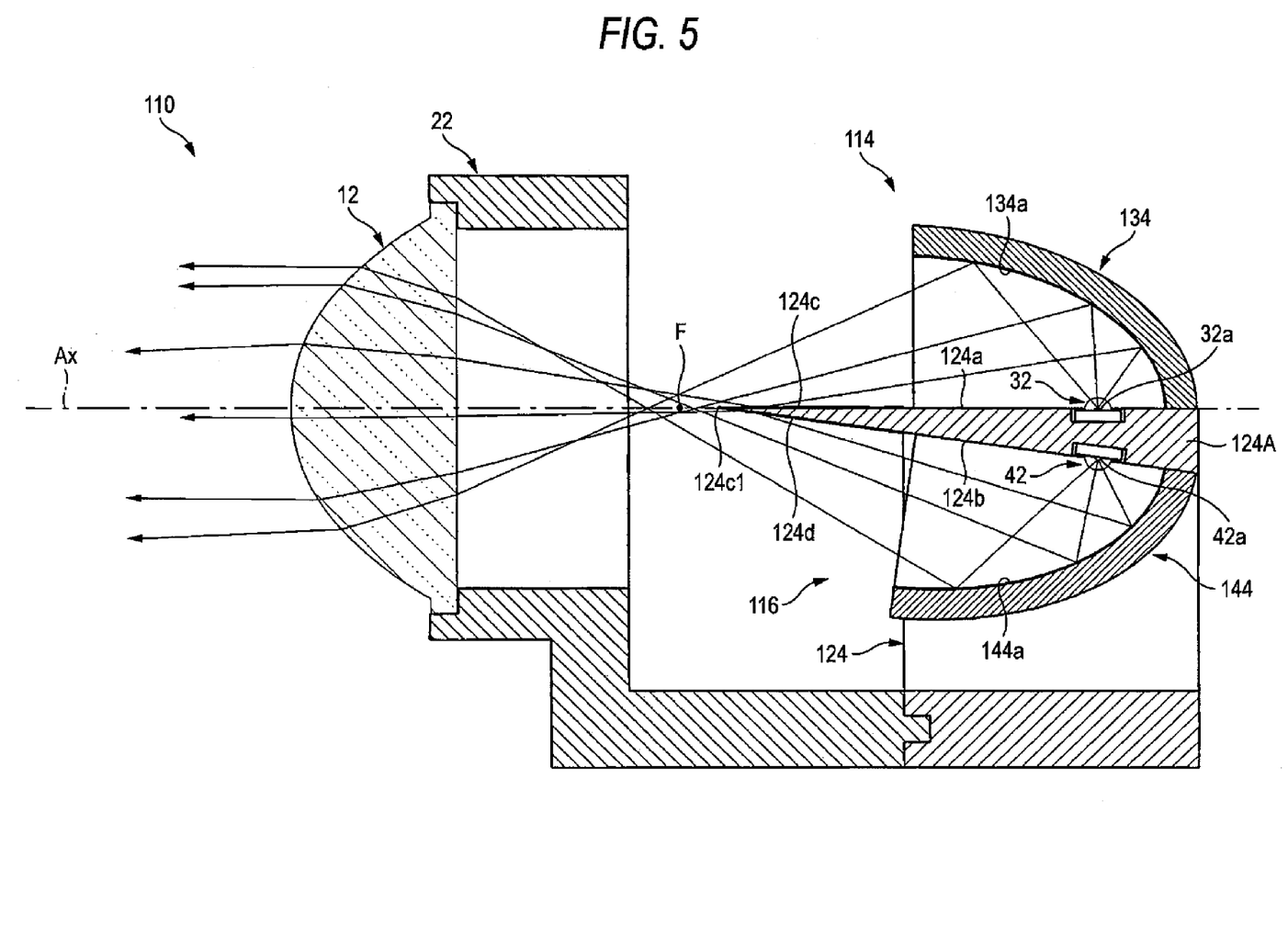
FIG. 5 is a view showing the vehicle lamp according to a first modified example of the embodiment and corresponding to FIG. 2.
Figure 6:
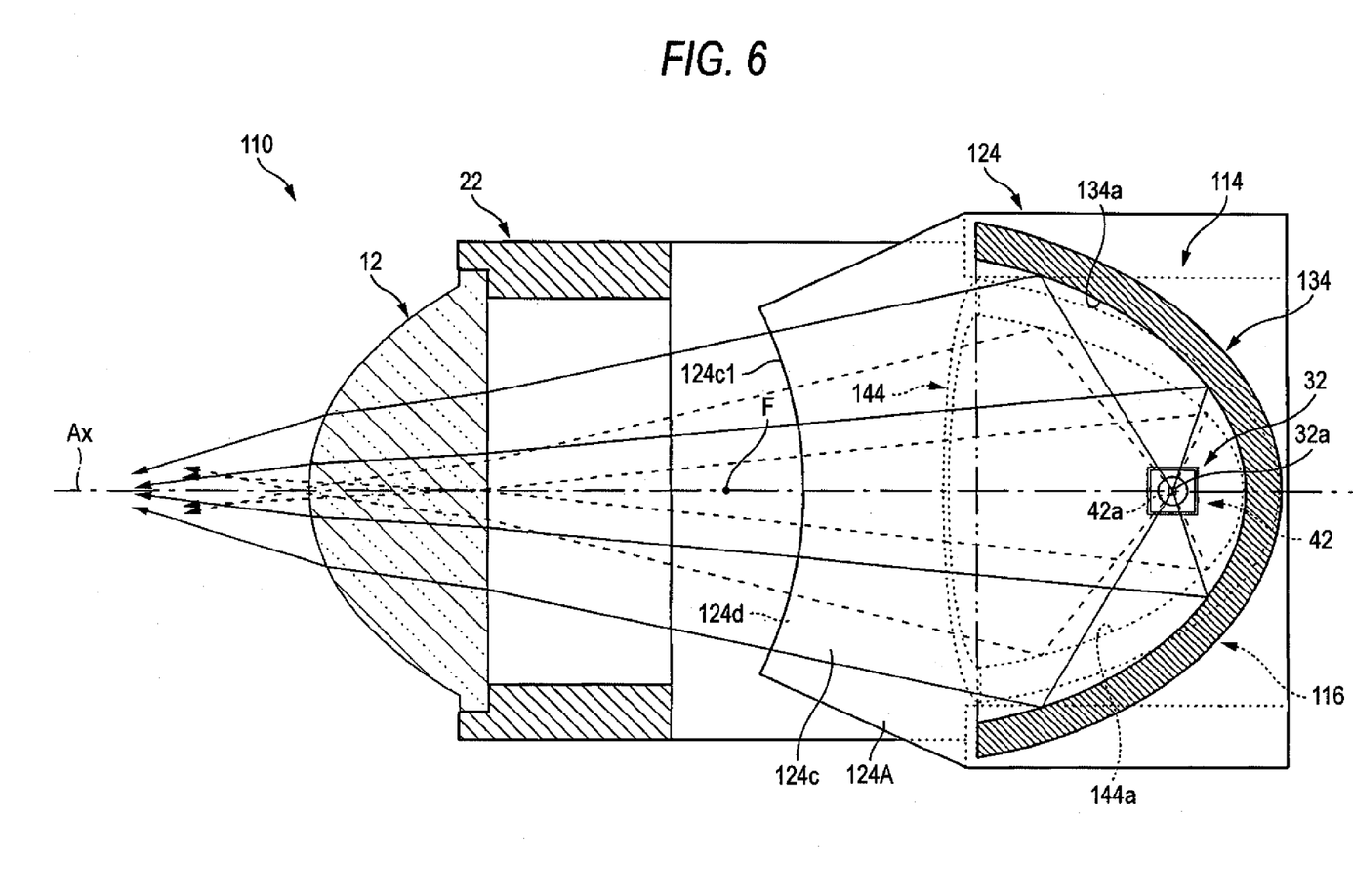
FIG. 6 is a view showing the vehicle lamp according to the first modified example and corresponding to FIG. 3.

FIGS. 5 and 6 are views showing a vehicle lamp 110 according to this modified example and corresponding to FIGS. 2 and 3.

As shown in the drawings, the basic configuration of the vehicle lamp 110 is the same as that of the above-described embodiment, but the configurations of a first reflector 134 of a first light source unit 114, a second reflector 144 of a second light source unit 116, and an upper wall portion 124A of a light source unit holder 124 are different from those of the above-described embodiment.

That is, a reflection surface 134a of the first reflector 134 of the first light source unit 114 is formed into a curved surface of a substantially oval shape in which the light emitting center of the first light emitting element 32 is set to the first focal point in the same manner as the reflection surface 34a of the first reflector 34 of the first light source unit 14 according to the above-described embodiment, thereby reflecting the infrared light emitted from the first light emitting element 32 toward the optical axis Ax in a lamp forward direction. However, the reflection surface 134a has a reflection surface shape in which a width is larger and a height is smaller than those of the reflection surface 34a according to the above-described embodiment. The reflection surface 134a has a perpendicular sectional shape taken along the optical axis Ax and formed in an oval shape in which a point positioned below the optical axis Ax and slightly positioned in front of the rear focal point F is set to the second focal point. Additionally, an eccentricity is set to gradually increase from the perpendicular section toward the horizontal section.

Accordingly, when the infrared light reflected by the reflection surface 134a passes through the rear focal plane of the projection lens 12, an infrared light passage region of the rear focal plane is set to a region of a horizontally-long oval shape in which the rear focal point F is set to a substantial center. The infrared light passage region is formed into a region of a horizontally-long oval shape in which a horizontal width is larger and a vertical width is smaller than those of the above-described embodiment.

On the other hand, a reflection surface 144a of the second reflector 144 of the second light source unit 116 is formed into a curved surface of a substantially oval shape in which the light emitting center of the second light emitting element 42 is set to the first focal point in the same manner as the reflection surface 44a of the second reflector 44 of the second light source unit 16 according to the above-described embodiment, thereby reflecting the visible light emitted from the second light emitting element 42 toward the optical axis Ax in a lamp forward direction. However, the reflection surface 144a has a reflection surface shape in which a width is substantially the same as that of the reflection surface 44a according to the above-described embodiment and a height is smaller than that of the reflection surface 44a. The reflection surface 144a has a perpendicular sectional shape taken along the optical axis Ax and formed in an oval shape in which a point positioned above the optical axis Ax and slightly positioned in front of the rear focal point F is set to the second focal point. Additionally, an eccentricity is set to gradually increase from the perpendicular section toward the horizontal section.

Accordingly, when the visible light reflected by the reflection surface 144a passes through the rear focal plane of the projection lens 12, a visible light passage region of the rear focal plane is set to a region of a horizontally-long oval shape in which the rear focal point F is set to a substantial center. The visible light passage region is set to a region of a horizontally-long oval shape in which a horizontal width is substantially the same as that of the above-described embodiment and a vertical width is smaller than that of the above described embodiment.

An upper wall portion 124A of a light source unit holder 124 has a configuration in which an upper surface 124a is formed into a horizontal surface including the optical axis Ax and a lower surface 124b is formed into an inclined surface inclined downward in a lamp backward direction in the same manner as the upper wall portion 24A of the light source unit holder 24 according to the above-described embodiment. However, the upper wall portion 124A further extends in a lamp forward direction as compared with the upper wall portion 24A according to the above-described embodiment and an extended front end portion thereof is formed into a wedge-shaped mirror member.

That is, a forward extended portion of the upper surface 124a of the upper wall portion 124A is formed into an upward reflection surface 124c subjected to a polishing process. Additionally, an extended portion of the lower surface 124b is formed into a downward reflection surface 124d subjected to the polishing process.

A front edge 124c1 of the upward reflection surface 124c is formed into a substantially arc-shaped curve that is curved in a horizontal direction so as to pass through the optical axis Ax in the vicinity of a position in rear of the rear focal point F of the projection lens 12 in a lamp forward direction. The downward reflection surface 124d obliquely extends downward from the front edge 124c1 of the upward reflection surface 124c in a lamp backward direction.

In the upper wall portion 124A formed as the mirror member, the upward reflection surface 124c reflects a part of the reflected light of the first reflector 134 in an upward direction so as to be incident to the projection lens 12, and the downward reflection surface 124d reflects the reflected light of the second reflector 144 in a downward direction so as to be incident to the projection lens 12.

Specifically, a front portion of the upward reflection surface 124c is configured to reflect upward the infrared light to pass through a lower region of the infrared light passage region in the rear focal plane of the projection lens 12 among the infrared light reflected by the reflection surface 134a of the first reflector 134. Additionally, a front portion of the downward reflection surface 124*d* is configured to reflect downward the visible light to pass through an upper region of the visible light passage region in the rear focal plane of the projection lens 12 among the visible light reflected by the reflection surface 144*a* of the second reflector 144.

Figure 7A:
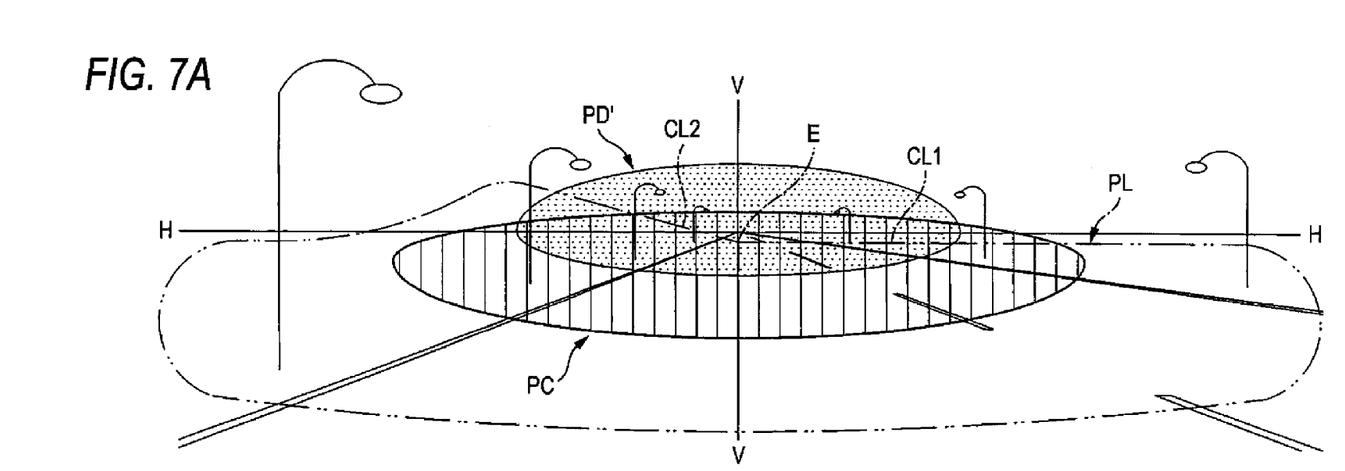
FIGS. 7A and 7B are perspective views showing a light distribution pattern formed by light irradiated forward from the vehicle lamp according to the first modified example and formed on the imaginary perpendicular screen, which corresponds to FIGS. 4A and 4B.
Figure 7B:
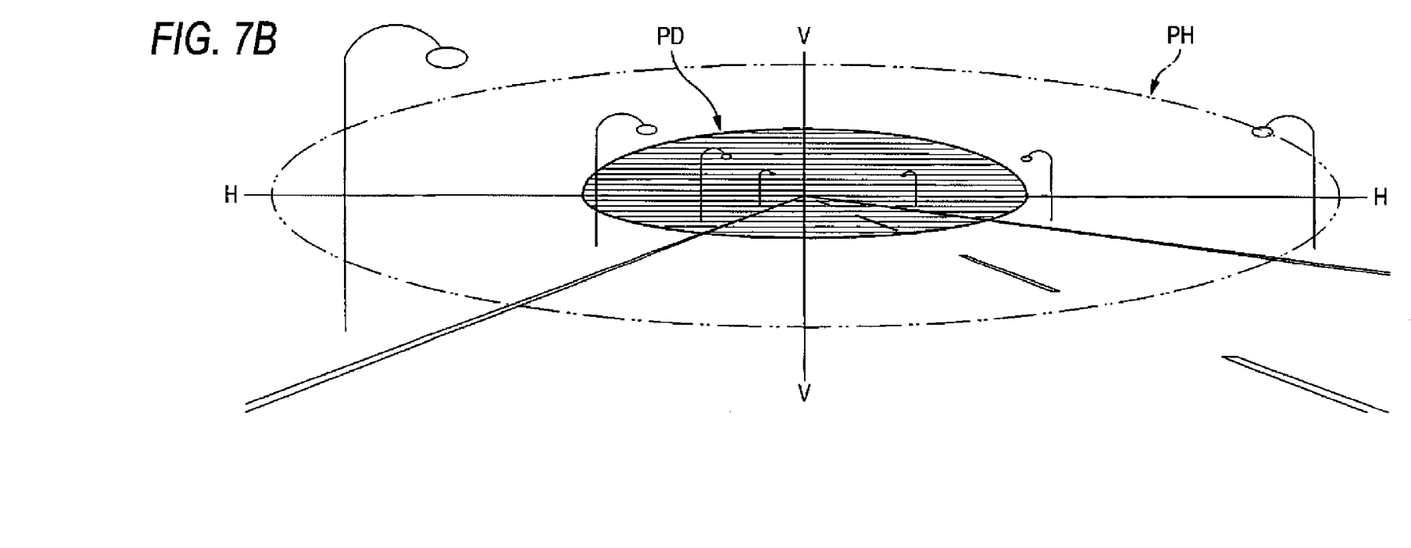

FIGS. 7A and 7B are perspective views showing a light distribution pattern formed by light irradiated forward from the vehicle lamp 110 according to this modified example and formed on the imaginary perpendicular screen disposed at a forward position distanced from the vehicle lamp by 25 m.

As shown in FIG. 7A, an infrared light distribution pattern PC formed upon turning on the first light source unit 114 is formed into a horizontally-long light distribution pattern in the same manner as the infrared light distribution pattern PA formed upon turning on the first light source unit 14 according to the above-described embodiment, but has an upper edge slightly flatter than a lower edge. Additionally, a horizontal divergence angle of the infrared light distribution pattern PC is larger than that of the infrared light distribution pattern PA and a vertical divergence angle thereof is smaller than that of the infrared light distribution pattern PA, thereby displacing downward the center position.

The reason why the horizontal divergence angle of the infrared light distribution pattern PC is larger than that of the infrared light distribution pattern PA is because a horizontal width of the infrared light passage region according to this modified example is set to be larger than that of the infrared light passage region according to the above-described embodiment. Additionally, the reason why the vertical divergence angle of the infrared light distribution pattern PC is smaller than that of the infrared light distribution pattern PA is because a vertical width of the infrared light passage region according to this modified example is smaller than that of the infrared light passage region according to the above-described embodiment and the infrared light to pass through the lower region of the infrared light passage region is reflected upward at a position on the front side so as to be incident to the projection lens 12. The reason why the infrared light distribution pattern PC has the upper edge slightly flatter than the lower edge and the center position slightly displacing downward from the center position of the infrared light distribution pattern PA is because the infrared light to pass through the lower region of the infrared light passage region is reflected upward so as to be incident to the projection lens 12.

As shown in FIGS. 7A and 7B, each of visible light distribution patterns PD and PD' formed upon turning on the second light source unit 116 is formed into a horizontally-long light distribution pattern in the same manner as the visible light distribution patterns PB and PB' formed upon turning on the second light source unit 16 according to the above-described embodiment, but has a lower edge slightly flatter than an upper edge. Additionally, a horizontal divergence angle of each of the visible light distribution patterns PD and PD' is substantially the same as that of each of the visible light distribution patterns PB and PB', but a horizontal divergence angle thereof is smaller than that of each of the visible light distribution patterns PB and PB', thereby slightly displacing upward the center position.

The reason why the vertical divergence angle of each of the visible light distribution patterns PD and PD' is smaller than that of each of the visible light distribution patterns PB and PB' is because a vertical width of the visible light passage region according to this modified example is smaller than that of the visible light passage region according to the above-described embodiment and the visible light to pass through the upper region of the visible light passage region is reflected downward at a position on the front side so as to be incident to the projection lens 12. The reason why each of the visible light distribution patterns PD and PD' has the lower edge slightly flatter than the upper edge and the center position slightly displacing upward from the center position of each of the visible light distribution patterns PB and PB' is because the visible light to pass through the upper region of the visible light passage region is reflected downward so as to be incident to the projection lens 12.

With the configuration according to this modified example, it is possible to form the infrared light distribution pattern PC into a light distribution pattern in which a vertical divergence angle is comparatively small and an infrared light density is comparatively large. Also, it is possible to form the infrared light distribution pattern PC into a light distribution pattern which irradiates the road surface in a broad horizontal range in a vehicle forward direction. Accordingly, it is possible to sufficiently irradiate a lane mark (i.e., a white line on both sides of a driving lane). Since a portion in the vicinity of the upper edge overlapping with the reflected light of the upward reflection surface 124*c* becomes brighter than other portions in the infrared light distribution pattern PC, it is possible to sufficiently irradiate the road surface in a vehicle forward direction without excessively brightly irradiating the road surface in the short-distance region in a vehicle forward direction.

Additionally, with the configuration according to this modified example, it is possible to form each of the visible light distribution patterns PD and PD' into a light distribution pattern in which a vertical divergence angle is comparatively small and a brightness is comparatively large, the visible light distribution patterns PD and PD' being more suitable for forming the hot zone of the high beam distribution pattern PH. A center position of each of the visible light distribution patterns PD and PD' slightly displaces upward from the point H-V, but a portion in the vicinity of the lower edge overlapping with the reflected light of the downward reflection surface 124*d* is brighter than other portions, thereby sufficiently irradiating the road surface in the long-distance region in a vehicle forward direction.

Next, a second modified example of the above-described embodiment will be described.

Figure 8:
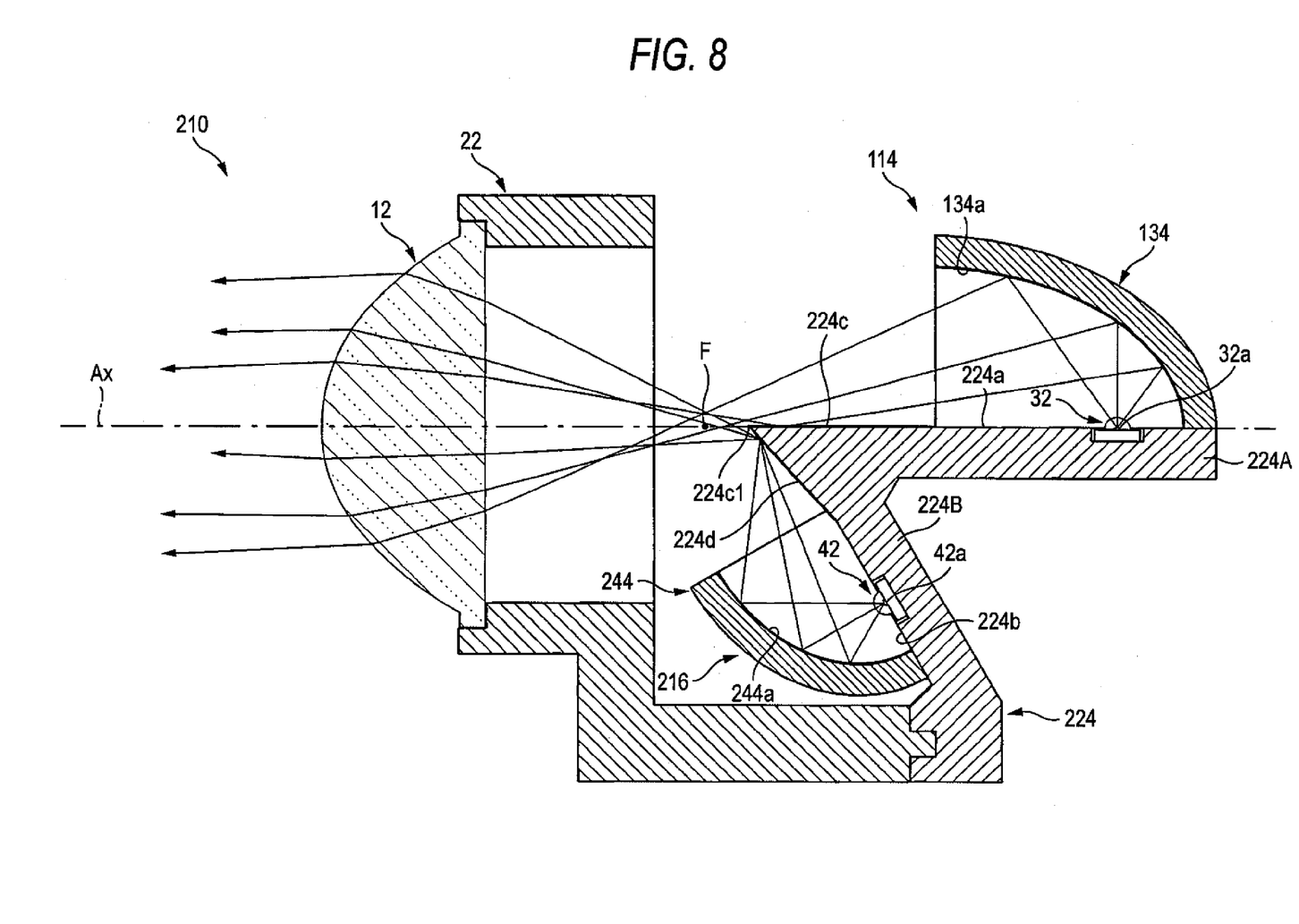
FIG. 8 is a view showing the vehicle lamp according to a second modified example of the embodiment and corresponding to FIG. 2.

FIG. 8 is a view showing a vehicle lamp 210 according to this modified example and corresponding to FIG. 2.

As shown in the drawing, the basic configuration of the vehicle lamp 210 is the same as that of the first modified example, but the configurations of a second reflector 244 of a second light source unit 216 and a light source unit holder 224 are different from those of the first modified example.

That is, the light source unit holder 244 of the second light source unit 216 includes an inclined wall portion 224B obliquely extending downward from a front end portion of an upper wall portion 224A in a lamp backward direction, and the front end portions of the upper wall portion 224A and the inclined wall portion 224B are formed into a wedge-shaped mirror member.

A front edge 224*c*1 of an upward reflection surface 224*c* which is a front extended portion of the upper surface 224*a* of the upper wall portion 224A is formed at a position substantially the same as that of the front edge 124*c*1 of the upward reflection surface 124*c* according to the first modified example. Additionally, a downward reflection surface 224*d* which is a front extended portion of the lower surface 224*b* of the inclined wall portion 224B is formed into a plane inclined by about 45 degrees with respect to a horizontal plane including the optical axis Ax. Further, a portion excluding the downward reflection surface 224*d* of the lower surface 224*b* of the inclined wall portion 224B is formed into a plane having an inclined angle slightly larger than that of the downward reflection surface 224d.

A peripheral upper end portion of a reflection surface 244a of the second reflector 244 of the second light source unit 216 is fixed to the lower surface 224b of the inclined wall portion 224B of the light source unit holder 224.

The reflection surface 244a of the second reflector 244 is formed into a curved surface of a substantially oval shape in which a light emitting center of a second light emitting element 42 is set to the first focal point in the same manner as the reflection surface 144a of the second reflector 144 of the second light source unit 116 according to the first modified example, thereby reflecting the visible light emitted from the second light emitting element 42 toward the optical axis Ax in a lamp forward direction. Here, the reflection surface 244a reflects considerably further upward the visible light emitted from the second light emitting element 42 as compared with the reflection surface 144a according to the first modified example.

The reflection surface 244a has a reflection surface shape in which a horizontal width and a height are substantially the same as those of the reflection surface 144a according to the first modified example and a longitudinal length is shorter than that of the reflection surface 144a. The reflection surface 244a has a perpendicular sectional shape taken along the optical axis Ax and formed in an oval shape in which a point disposed on the downward reflection surface 224d and disposed in the vicinity of the front edge 224c1 of the upward reflection surface 224c is set to the second focal point. Additionally, an eccentricity is set to gradually increase from the perpendicular section toward the horizontal section.

Accordingly, most of the visible light reflected by the reflection surface 244a is reflected in a downward direction of the downward reflection surface 224d so as to be incident to the projection lens 12. When the visible light reflected by the downward reflection surface 224d passes through the rear focal plane of the projection lens 12, the visible light passage region of the rear focal plane is set to a horizontally-long oval shape, in which the rear focal point F is set to a substantial center. The visible light passage region is formed into a region of a horizontally-long oval shape in which a horizontal width and a vertical width are substantially the same as those of the visible light passage region in a case where a reflection is not carried out by the downward reflection surface 124d according to the first modified example.

Figure 9A:
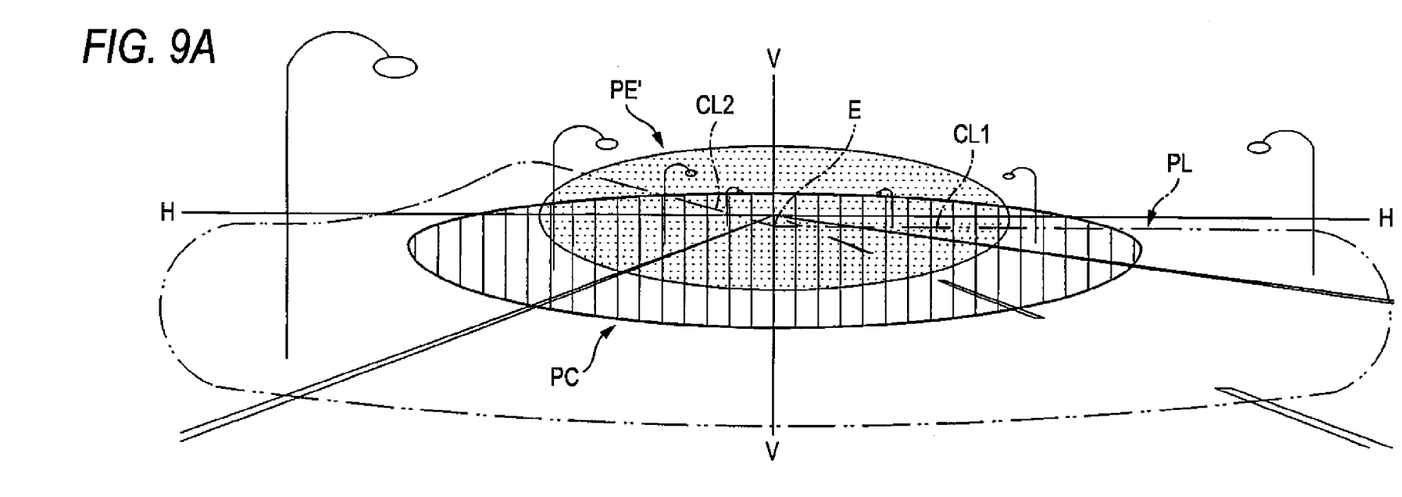
FIGS. 9A and 9B are perspective views showing a light distribution pattern formed by light irradiated forward from the vehicle lamp according to the second modified example and formed on the imaginary perpendicular screen, which corresponds to FIGS. 4A and 4B.
Figure 9B:
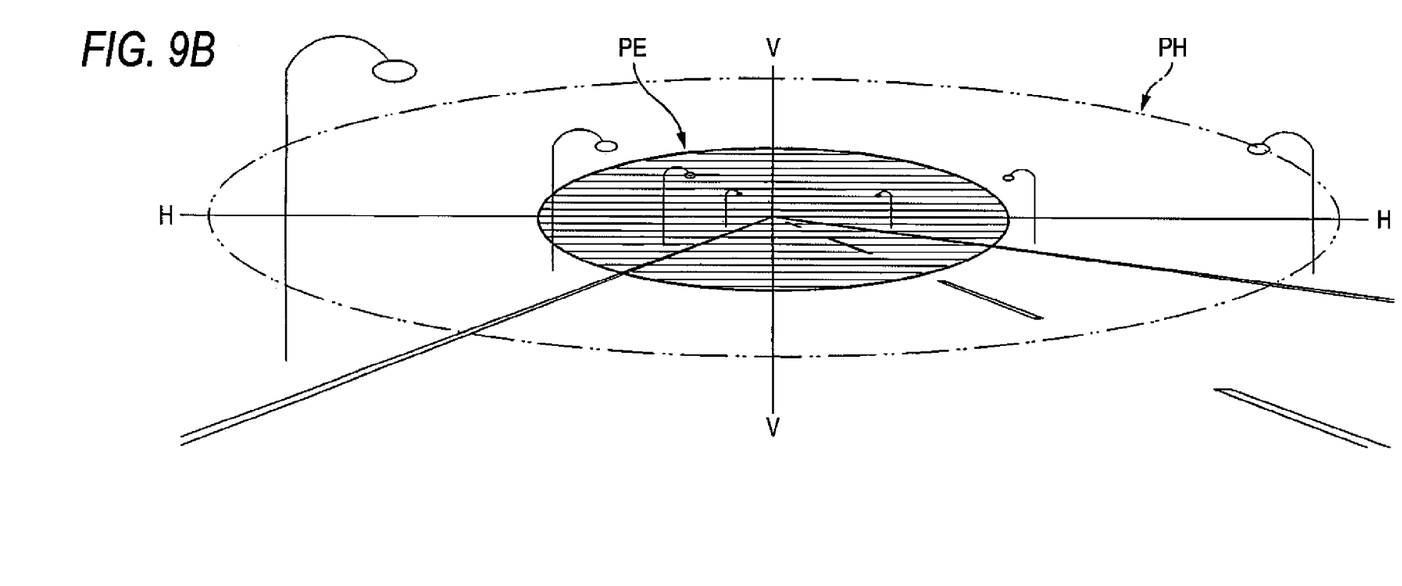

FIGS. 9A and 9B are perspective views showing a light distribution pattern formed by light irradiated forward from the vehicle lamp 210 according to this modified example and formed on the imaginary perpendicular screen disposed at a forward position distanced from the vehicle lamp by 25 m.

As shown in FIG. 9A, the infrared light distribution pattern PC formed upon turning on the first light source unit 114 is the same as that of the first modified example.

Meanwhile, as shown in FIGS. 9A and 9B, each of visible light distribution patterns PE and PE' formed upon turning on the second light source unit 216 is formed into a horizontally-long light distribution pattern in the same manner as the visible light distribution patterns PD and PD' formed upon turning on the second light source unit 116 according to the first modified example, but has a lower edge which is not slightly flatter than an upper edge unlike the visible light distribution patterns PD and PD'. Additionally, a horizontal divergence angle of each of the visible light distribution patterns PE and PE' is the substantially the same as that of each of the visible light distribution patterns PD and PD' and a vertical divergence angle thereof is slightly larger than that of each of the visible light distribution patterns PD and PD', thereby positioning the center position in the vicinity of the point H-V.

The reason why the vertical divergence angle of each of the visible light distribution patterns PD and PD' is slightly larger than that of each of the visible light distribution patterns PB and PB' is because a vertical width of the visible light passage region according to this modified example is enlarged by an amount in which the reflection is not carried out by the downward reflection surface 124d according to the first modified example. Additionally, the center position of each of the visible light distribution patterns PD and PD' is positioned in the vicinity of the point H-V for the same reason.

With the configuration according to this modified example, it is possible to form the infrared light distribution pattern PC in the same manner as the first modified example and to form the visible light distribution patterns PE and PE' into a horizontally-long light distribution pattern with respect to the position in the vicinity of the H-V, the visible light distribution patterns PE and PE' being suitable for forming the hot zone of the high beam distribution pattern PH.

As described above, according to exemplary embodiments of the present invention, a vehicle lamp is configured to irradiate infrared light in a vehicle forward direction, and includes: a projection lens disposed along an optical axis extending in a lamp backward and forward direction; and first and second light source units disposed in the rear of the projection lens. The first light source unit includes: a first light emitting element which is disposed in the rear of a rear focal point of the projection lens and emits the infrared light; and a first reflector which reflects the infrared light toward the optical axis in a lamp forward direction. An infrared light distribution pattern is formed by the infrared light which is reflected by the first reflector to pass through the projection lens. The second light source unit includes: a second light emitting element which is disposed in the rear of the rear focal point of the projection lens and emits visible light; and a second reflector which reflects the visible light toward the optical axis in a lamp forward direction. A visible light distribution pattern is formed by the visible light which is reflected by the second reflector to pass through the projection lens. The visible light distribution pattern overlaps with the infrared light distribution pattern. When the first light source unit is turned on, the second light source unit is turned on simultaneously with the first light source.

"The light emitting element" indicates an element-shaped light source having a light emitting chip in which a surface-emission occurs in an almost dot shape. A type thereof is not particularly limited, but for example, a light emitting diode, a laser diode, or the like may be employed.

"The visible light distribution pattern" indicates a light distribution pattern formed upon irradiating the visible light, and "the infrared light distribution pattern" indicates a light distribution pattern formed upon irradiating the infrared light.

If "the visible light distribution pattern" is a light distribution pattern formed at a position overlapping with the infrared light distribution pattern, a specific shape or size thereof is not particularly limited. "The visible light distribution pattern" may be a light distribution pattern substantially and completely overlapping with the infrared light distribution pattern or a light distribution pattern partly overlapping with the infrared light distribution pattern. Additionally, a specific usage of "the visible light distribution pattern" is not particularly limited. For example, a high beam distribution pattern for a head lamp, a light distribution pattern for a driving lamp, a light distribution pattern for a daytime running lamp, a light distribution pattern for a clearance lamp, or a light distribution pattern forming a part of these light distribution patterns may be employed.

According to exemplary embodiments of the present invention, the vehicle lamp is configured to irradiate the infrared light in a vehicle forward direction, but includes the projection lens disposed along the optical axis extending in a lamp backward and forward direction, the first light source unit for irradiating the infrared light, and the second light source unit for irradiating the visible light, the first and second light source units being disposed in the rear of the projection lamp. Since the second light source unit is simultaneously turned on upon turning on the first light source unit, the visible light is simultaneously irradiated upon irradiating the red light. Accordingly, it is possible to prevent in advance the projection lens from being tinged with red when the vehicle lamp is observed from the front side.

The first light source unit is configured to form the infrared light distribution pattern in such a manner that the infrared light emitted from the first light emitting element disposed in rear of the rear focal point of the projection lens is reflected by the first reflector toward the optical axis in a lamp forward direction, and passes through the projection lens so as to irradiate the infrared light in a lamp forward direction. Additionally, the second light source unit is configured to form the visible light distribution pattern at a position overlapping with the infrared light distribution pattern in such a manner that the visible light emitted from the second light emitting element disposed in the rear of the rear focal point of the projection lens is reflected by the second reflector toward the optical axis in a lamp forward direction, and passes through the projection lens so as to irradiate the visible light in a lamp forward direction. Accordingly, it is possible to obtain one or more of the following effects and advantages.

Since the position of the first light source unit or the shape of the reflection surface of the first reflector is appropriately set, it is possible to easily form the infrared light distribution pattern having a desired shape or size. Accordingly, it is possible to arbitrarily set an infrared light irradiation range. On the other hand, since the position of the second light source unit or the shape of the reflection surface of the second reflector is appropriately set, it is possible to easily form the visible light distribution pattern overlapping with the infrared light distribution pattern and having a desired shape or size. Accordingly, it is possible to arbitrarily set a visible light irradiation range.

Likewise, according to exemplary embodiments of the present invention, in the vehicle lamp configured to irradiate the infrared light in a vehicle forward direction, it is possible to easily form the visible light distribution pattern in such a manner that the front lens is prevented from being tinged with red upon irradiating the infrared light, and the visible light is separately irradiated in addition to the infrared light.

In the above-described configuration, when the second light source unit and the first light source unit are simultaneously turned on, the second light source unit is turned on so as to be dimmer than the normal lamp-on state. Accordingly, it is possible to obtain one or more of the following effects and advantages.

In a case where the high beam distribution pattern for the head lamp or the light distribution pattern for the driving lamp is formed by normally turning on the second light source unit, the visible light irradiated in a lamp forward direction has a brightness exceeding a brightness level required to prevent the projection lens from being tinged with red. This may lead to giving a glare to a driver or the like in the opposite vehicle.

Thus, in such a case, when the second light source unit is turned on so as to be dimmer than a normal lamp-on state, it is possible to prevent the projection lens from being tinged with red without giving a glare to the driver or the like in the opposite vehicle.

On the other hand, in a case where the light distribution pattern for the daytime running lamp or the light distribution pattern for the clearance lamp is formed by normally turning on the second light source unit, the visible light irradiated in a lamp forward direction has a brightness approximate to the brightness level required to prevent the projection lens from being tinged with red. Accordingly, even when the second light source unit is normally turned on, it is possible to prevent the projection lens from being tinged with red without giving a glare to the driver or the like in the opposite vehicle.

In the above-described configuration, when the visible light distribution pattern formed by the second light source unit is formed into a light distribution pattern extended up to a position above the infrared light distribution pattern, it is possible to prevent the projection lens from being tinged with red even when the vehicle lamp is observed in all directions within an angular range capable of seeing a pedestrian or the driver in the opposite vehicle.

When the first reflector is disposed above the optical axis and the second reflector is disposed below the optical axis, this allows the reflected light of the first and second reflectors to be incident to the projection lens comparatively close to the optical axis upon forming the visible light distribution pattern formed by the second light source unit into a light distribution pattern extended up to a position above the infrared light distribution pattern. Accordingly, it is possible to form the visible light distribution pattern and the infrared light distribution pattern with high precision.

In such a case, the vehicle lamp includes a mirror member disposed between the first reflector and the second reflector. The mirror member is formed with: an upward reflection surface substantially extending backward along the optical axis from the vicinity of a position in the rear of the rear focal point of the projection lens; and a downward reflection surface obliquely extending downward from a front edge of the upward reflection surface toward a lamp backward direction. The upward reflection surface of the mirror member reflects upward at least a part of the reflected light of the first reflector so as to be incident to the projection lens, and the downward reflection surface thereof reflects downward at least a part of the reflected light of the second reflector so as to be incident to the projection lens. Thus, it is possible to form the infrared light distribution pattern into a light distribution pattern in which a vertical divergence angle is comparatively small and an infrared light density is comparatively large. Additionally, it is possible to form the visible light distribution pattern into a light distribution pattern in which a vertical divergence angle is comparatively small and brightness is comparatively large.

A specific reflection surface shape of "the upward reflection surface" of the mirror member is not particularly limited. Additionally, a specific reflection surface shape or a specific inclined angle of "the downward reflection surface" is not particularly limited.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

The invention claimed is:

1. A vehicle lamp configured to irradiate infrared light in a vehicle forward direction, the vehicle lamp comprising:
a projection lens disposed along an optical axis extending in a lamp backward and forward direction; and
first and second light source units disposed in the rear of the projection lens,
wherein the first light source unit includes:
a first light emitting element which is disposed in the rear of a rear focal point of the projection lens and emits the infrared light; and
a first reflector which reflects the infrared light toward the optical axis in a lamp forward direction,
wherein an infrared light distribution pattern is formed by the infrared light which is reflected by the first reflector to pass through the projection lens,
wherein the second light source unit includes:
a second light emitting element which is disposed in the rear of the rear focal point of the projection lens and emits visible light; and
a second reflector which reflects the visible light toward the optical axis in a lamp forward direction,
wherein a visible light distribution pattern is formed by the visible light which is reflected by the second reflector to pass through the projection lens,
wherein the visible light distribution pattern overlaps with the infrared light distribution pattern, and
wherein when the first light source unit is turned on, the second light source unit is turned on simultaneously with the first light source,
wherein when the first light source unit and the second light source unit are simultaneously turned on, the second light source unit is turned on so as to be dimmer than a normal lamp-on state.

2. The vehicle lamp according to claim 1, wherein the visible light distribution pattern is extended up to a position above the infrared light distribution pattern.

3. The vehicle lamp according to claim 1, wherein the visible light distribution pattern is extended up to a position above the infrared light distribution pattern.

4. The vehicle lamp according to claim 2, wherein the first reflector is disposed above the optical axis and the second reflector is disposed below the optical axis.

5. The vehicle lamp according to claim 3, wherein the first reflector is disposed above the optical axis and the second reflector is disposed below the optical axis.

6. The vehicle lamp according to claim 4, further comprising:
a mirror member disposed between the first reflector and the second reflector, the mirror member being formed with:
an upward reflection surface substantially extending backward along the optical axis from the vicinity of a position in the rear of the rear focal point of the projection lens; and
a downward reflection surface obliquely extending downward from a front edge of the upward reflection surface toward a lamp backward direction, and
wherein the upward reflection surface reflects upward at least a part of the infrared light reflected by the first reflector such that said part of the infrared light is incident to the projection lens, and
wherein the downward reflection surface reflects downward at least a part of the visible light reflected by the second reflector such that said part of the visible light is incident to the projection lens.

7. The vehicle lamp according to claim 5, further comprising:
a mirror member disposed between the first reflector and the second reflector, the mirror member being formed with:
an upward reflection surface substantially extending backward along the optical axis from the vicinity of a position in the rear of the rear focal point of the projection lens; and
a downward reflection surface obliquely extending downward from a front edge of the upward reflection surface toward a lamp backward direction, and
wherein the upward reflection surface reflects upward at least a part of the infrared light reflected by the first reflector such that said part of the infrared light is incident to the projection lens, and
wherein the downward reflection surface reflects downward at least a part of the visible light reflected by the second reflector such that said part of the visible light is incident to the projection lens.

* * * * *